United States Patent [19]
Ohtsu

[11] Patent Number: 6,014,730
[45] Date of Patent: Jan. 11, 2000

[54] DYNAMIC ADDING SYSTEM FOR MEMORY FILES SHARED AMONG HOSTS, DYNAMIC ADDING METHOD FOR MEMORY FILES SHARED AMONG HOSTS, AND COMPUTER-READABLE MEDIUM RECORDING DYNAMIC ADDING PROGRAM FOR MEMORY FILES SHARED AMONG HOSTS

[75] Inventor: Toshiyuki Ohtsu, Tokyo, Japan

[73] Assignee: NEC Corporation, Tokyo, Japan

[21] Appl. No.: 08/993,096

[22] Filed: Dec. 18, 1997

[30] Foreign Application Priority Data

Dec. 26, 1996 [JP] Japan ................................ 8-348562

[51] Int. Cl.[7] ............................................. G06F 12/00
[52] U.S. Cl. ........................ 711/170; 711/216; 711/2; 711/130; 711/147
[58] Field of Search ........................... 711/170, 216, 711/2, 130, 147, 121, 220, 206, 155; 701/1

[56] References Cited

U.S. PATENT DOCUMENTS

| | | | |
|---|---|---|---|
| 4,961,139 | 10/1990 | Hong et al. ................................ | 707/1 |
| 5,535,365 | 7/1996 | Barriuso et al. ........................ | 711/155 |
| 5,584,005 | 12/1996 | Miyaoku et al. ........................ | 711/206 |
| 5,765,219 | 6/1998 | Densham et al. ........................ | 711/220 |
| 5,860,070 | 1/1999 | Tow et al. .................................... | 707/8 |
| 5,860,101 | 1/1999 | Arimilli et al. ........................ | 711/121 |
| 5,899,994 | 5/1999 | Mohamed et al. ....................... | 711/118 |

FOREIGN PATENT DOCUMENTS 4-370849  12/1992  Japan .

Primary Examiner—John W. Cabeca
Assistant Examiner—Fred F. Tzeng
Attorney, Agent, or Firm—Young & Thompson

[57] ABSTRACT

In response to an extension request to a shared memory file 104, shared file adding means 111 allocates an (additional) memory file 110; inter-host locking means 103 locks a hash table 106; hash table updating means 108 checks the number of data blocks in the (additional) shared memory file, and updates the hash table 106 to alter one of the data block addresses, out of those stored in entries in the hash table 106, pointing to the same data block in the shared buffer 104 so as to point to a data block in the (additional) shared memory file 110; and the added shared memory file 110 is thereby made available for shared use.

9 Claims, 4 Drawing Sheets

DYNAMIC ADDING SYSTEM FOR MEMORY FILES SHARED AMONG HOSTS, DYNAMIC ADDING METHOD FOR MEMORY FILES SHARED AMONG HOSTS, AND COMPUTER-READABLE MEDIUM RECORDING DYNAMIC ADDING PROGRAM FOR MEMORY FILES SHARED AMONG HOSTS

BACKGROUND OF THE INVENTION

1. Field of the Invention

The present invention relates to a dynamic adding system for memory files shared among hosts, a dynamic adding method for memory files shared among hosts, and a computer-readable medium recording dynamic adding program for memory files shared among hosts for dynamically expanding the available area in shared memory files by dynamically increasing the number of memory files shared in a multi processor system.

2. Description of the Related Art

The Gazette of the Japanese Patent Laid-open No. 370849/1992 describes a technique to alter the size of one shared memory area shared among a plurality of application programs in one host computer. The host computer consists of one shared memory area accessible from a plurality of application programs; a memory management table for managing the shared memory area; a maximum required size determining function, responsive to requests from a plurality of application programs for expansion of the shared memory area, for determining the greatest size of the requested expansions; a memory expanding function for expanding the shared memory area in accordance with the maximum required size; a minimum required size determining function, responsive to requests from a plurality of application programs for compression of the shared memory area, for determining the smallest size of the requested compressions; and a memory compressing function for compressing the shared memory area in accordance with the minimum required size.

However, according to this prior art technique, each of the plurality of application programs does not notify other application programs of the request it issues for shared memory area expansion or compression. As a result, if an application program requests securing of the shared memory area in a desired size, the shared memory size may be already compressed to a size smaller than the desired size to make it impossible for the requesting application program to secure the size it desires. In every such case, the shared memory area should be expanded, entailing the problem that accessing the shared memory area is made extremely inefficient.

Moreover, there is another problem that, where this prior art is to be applied to the management of a plurality of shared memory areas, i.e. If each of a plurality of application programs requests expansion or compression of the plurality of different shared memory areas without notifying other application programs, vast fragmentation will arise in the memory region containing those shared memory areas.

SUMMARY AND OBJECTS OF THE INVENTION

An object of the present invention is to make possible efficient sharing of a plurality of shared memory files in a multiprocessor system.

Another object of the invention is to make possible efficient use of a memory region containing a plurality of shared memory files to be shared in a multi processor system.

A first dynamic adding system for memory files shared among hosts according to the invention is provided with an external memory unit involving a shared memory file comprising a plurality of data blocks of the same size; hash tables each comprising a plurality of entries each associated with one or another of said data blocks; a plurality of host computers for hashing, when data are stored into each of said data blocks, the identifier of the data, determining the associated entry in the hash table based on the result of the hashing and storing the data into the data block associated with the entry, and inter-host locking means for exclusively controlling access to said hash tables possessed by said host computers, wherein:

said external memory unit further includes a control file for storing information on association between data blocks in said shared memory file and entries in said hash table, and each of said host computers has shared memory file access means which, if the host computer is actuated before any other host computer, exclusively controls with said inter-host locking means access by other host computers to said hash tables of the respective other host computers; acquires the whole number of data blocks in said shared memory file; prepares said hash table comprising entries no less than the number of the data blocks; stores into said control file information on association between the entries in the hash table and the data blocks in said shared memory file; and releases with said inter-host locking means the exclusive control on access by other host computers to said hash tables possessed by the other host computers; or, if the host computer is actuated after any other host computer, exclusively controls with said inter-host locking means access by other host computers to said hash tables of the respective other host computers; reads said associating information out of said control file; prepares said hash table within its own computer on the basis of said associating information; and releases with said inter-host locking means the exclusive control on access by other host computers to said hash tables possessed by the other host computers.

In a second dynamic adding system for memory files shared among hosts according to the invention, each of said host computers is provided with, in addition to the configuration of the first dynamic adding system for memory files shared among hosts, shared memory adding means for adding said shared memory file on said external memory unit; and hash table updating means for exclusively controlling with said inter-host locking means, after said shared memory file is added to said external memory by said shared file adding means, access by other host computers to said hash tables of the respective other host computers; associating one of the plurality of entries in said hash table, associated with a specific data block in existing said shared memory file, with one of the plurality of data blocks in added said shared memory file; transferring, if the associated entry in said hash table is associated with the result of hashing of the identifier of data in the specific data block, the data of the specific data block to the associated data block in added said shared memory file; updating said associating information stored in said control file; and releasing with said inter-host locking means the exclusive control on access by other host computers to said hash tables possessed by the other host computers.

In each host computer of a third dynamic adding system for memory files shared among hosts according to the invention, said hash table updating means, in addition to the functions of the second dynamic adding system for memory files shared among hosts, further updates, if said associating information stored in said control file is updated by another host computer, said hash table of its own host computer on the basis of the updated associating information.

A first dynamic adding method for memory files shared among hosts according to the invention includes a data storing step at which each of a plurality of host computers hashes, when data are stored in each of a plurality of data blocks of the same size constituting a shared memory file to be used by the plurality of host computers, the identifier of the data to determine the associated entry in a hash table comprising a plurality of entries each associated with one or another of said data blocks; and stores the data into the data block associated with the entry; and a hash table preparing step at which each of said host computers, if the host computer is actuated before any other host computer, exclusively controls access by other host computers to said hash tables of the respective other host computers; acquires the whole number of data blocks in said shared memory file; prepares said hash table comprising entries no less than the number of the data blocks; stores into the control file, shared by said host computers, information associating the entries in the hash table with the data blocks in said shared memory file; and releases the exclusive control on access by other host computers to said hash tables possessed by the other host computers; or, if the host computer is actuated after any other host computer, exclusively controls access by other host computers to said hash tables of the respective other host computers; reads said associating information out of said control file; prepares said hash table within its own computer on the basis of said associating information; and releases the exclusive control on access by other host computers to said hash tables possessed by the other host computers.

A second dynamic adding method for memory files shared among hosts according to the invention, includes, in addition to the steps of the first dynamic adding method for memory files shared among hosts, a shared file adding step at which at which each of said host computers adds said shared memory file; and a hash table updating step at which each of said plurality of host computers exclusively controls access by other host computers to said hash tables of the respective other host computers; associates one of the plurality of entries in said hash table associated with a specific data block in existing said shared memory file with one of the plurality of data blocks in said shared memory file added at said shared file adding step; transfers, if the entry in said hash table, which has been associated, is associated with the result of hashing of the identifier of data in the specified data block, the data of the specific block to the data block in added said shared memory file, which has been associated; updates said associating information stored in said control file; and releases the exclusive control on access by other host computers to said hash tables possessed by the other host computers.

A third dynamic adding method for memory files shared among hosts according to the invention comprises the steps of the second dynamic adding method for memory files shared among hosts wherein: at said hash table updating step, if said associating information stored in said control file is updated by another host computer than a first host computer, said hash table of said first host computer is further updated on the basis of the updated associating information.

A first computer-readable medium according to the invention records a program to cause each of a plurality of host computers to perform storage processing to hash, when data are stored into each of a plurality of data blocks of the same size constituting a shared memory file to be shared by said host computers, the identifier of the data, thereby determine the associated entry in hash tables each comprising a plurality of entries each associated with one or another of said data blocks, and store the data into the data block associated with the entry; and hash table preparation processing to exclusively control, if the host computer is actuated before any other host computer, access by other host computers to said hash tables possessed by the other host computers; acquire the whole number of data blocks in said shared memory file; prepare said hash table comprising entries no less than the number of the data blocks; store into a control file shared by said host computers information on association between the entries in the hash table and the data blocks in said shared memory file; and release the exclusive control on access by other host computers to said hash tables possessed by the other host computers; or, if the host computer is actuated after any other host computer, exclusively control access by other host computers to said hash tables of the respective other host computers; read said associating information out of said control file; prepare said hash table within its own host computer on the basis of said associating information; and release the exclusive control on access by other host computers to said hash tables possessed by the other host computers.

A second computer-readable medium according to the invention records a program, in addition to the program recorded in the first computer-readable medium, to cause each of said host computers to perform shared memory adding processing to add said shared memory file; and hash table update processing to exclusively control access by other host computers to said hash tables of the respective other host computers; associate one of the plurality of entries in said hash table, associated with a specific data block in existing said shared memory file, with one of the plurality of data blocks in said shared memory file added at said shared file adding step; transfer, if the associated entry in said hash table is associated with the result of hashing of the identifier of data in the specific data block, the data of the specific data block to the associated data block in added said shared memory file; update said associating information stored in said control file; and release the exclusive control on access by other host computers to said hash tables possessed by the other host computers.

A third computer-readable medium according to the invention records a program to augment said hash table update processing by the program recorded in the second computer-readable medium with processing to update, if said associating information stored in said control file is updated by another host computer, said hash table of its own host computer on the basis of the updated associating information.

BRIEF DESCRIPTION OF THE DRAWINGS

The invention will be understood more fully from the detailed description given here below and from the accompanying drawings of preferred embodiments thereof, which, however, should not be regarded as limiting the invention, but are only intended for explanation and to facilitate understanding.

Here it should be noted that like reference numerals represent like elements throughout the disclosure.

DETAILED DESCRIPTION OF THE PREFERRED EMBODIMENTS

Next, preferred embodiments of the present invention will be described in detail with reference to drawings.

Figure 1:
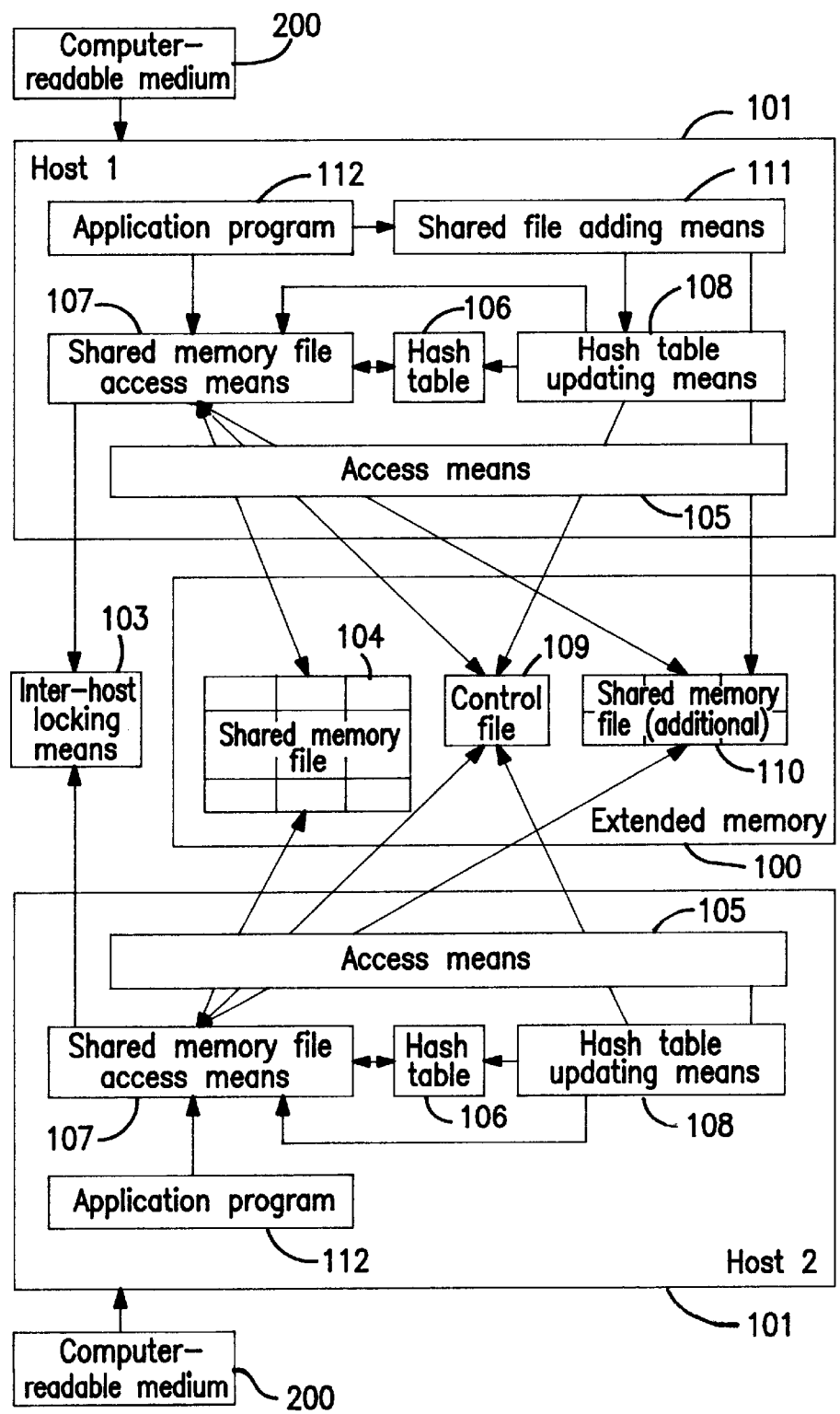
FIG. 1 is a block diagram illustrating a preferred embodiment of the invention.

Referring to FIG. 1, a first preferred embodiment of the invention consists of an extended memory 100, hosts 1 (101) and 2 (102) operating under programmed control and sharing the extended memory 100, and inter-host locking means 103 making possible exclusive control between the hosts 1 and 2.

The extended memory 100 further includes a shared memory file 104, an additional shared memory file 110 and a control file 109. Each of the hosts 1 and 2 includes extended memory file access means 107, a hash table 106, access means 105, hash table updating means 108, and an application program 112, and the host 1 further includes shared memory adding means 111.

The extended memory 100 is a free-to-read/write external storage for shared use by the hosts 1 and 2.

Although this embodiment is an example having two hosts, a configuration involving more than two hosts is also possible. Also, though only the host 1 has the shared file adding means 111 in this embodiment, this is not to specify the executing host for the shared file adding means 111.

Although the inter-host locking means 103 is intended to control exclusive operation between the hosts 1 and 2, locking requests from a plurality of hosts can as well be subjected to programmed control by software stored in the extended memory 100.

The shared memory file 104 is a file on the extended memory 100 for storing data for shared use between the hosts 1 and 2, and contains a plurality of data blocks of the same size.

The (additional) shared memory file 110, another file on the extended memory 100 for storing data for shared use between the hosts 1 and 2, is to be added following the shared memory file 104.

The control file 109 is an area to hold the relationship between the shared memory files and hash tables, and set by the shared memory file access means 107. When a shared memory file 110 is added by the shared memory file adding means 111, it is updated by the hash table updating means 108.

The access means 105 is a driver for data reading out or writing into the extended memory 100.

Figure 2:
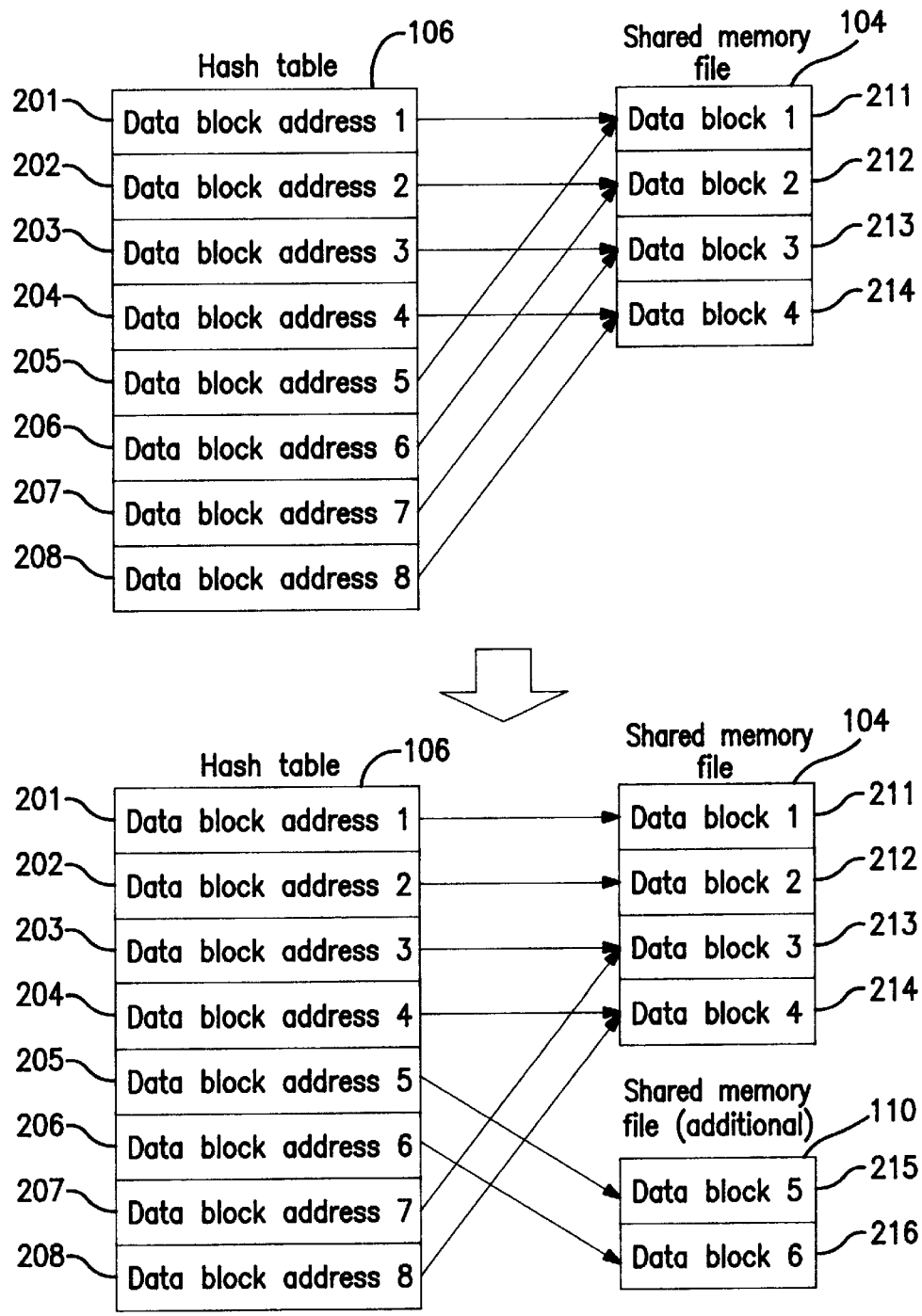
FIG. 2 illustrates the relationship among a hash table 106, a shared memory file 104 and another (additional) shared memory file 110 in the preferred embodiment of the invention.

The hash table 106 is a table associating the identifiers of data registered on the shared memory file 104 with the positions of pertinent data (data blocks) on the shared memory file 104. The identifier of data delivered from the application program 112 is hashed, and the position of the data (data block), i.e. the data block address, is stored into the entry as mapped against the total number of entries in the hash table. FIG. 2 shows the relationship between the hash table and the shared memory file.

The shared memory file access means 107, in accordance with a request from the application program 112, refers to the hash table 106 in accessing data on the shared memory file 104 and the added shared memory file 110. When a host is actuated, if the other host is not yet actuated (checking whether or not the other host has been actuated is accomplished by a known function of a computer system consisting of multiple hosts), the number of the data blocks in all the shared memory files present on the extended memory 100 is acquired, the hash table 106 is prepared on the basis of that number, and that information is stored into the control file 109. If the other host has already been actuated, information is read out of the control file 109, and the hash table 106 is prepared on that basis.

The application program 112 is a user program for accessing data to be shared between the hosts.

The shared file adding means 111 dynamically expands the data space of the shared memory files by adding another (additional) shared memory file 110 to the shared memory file 104 for shared use between the hosts by updating the data block addresses in the entries in the hash table 106 without altering the hash width (the number of entries in the hash table 106).

FIG. 2 illustrates the relationship among the hash table 106, the shared memory file 104 and the (additional) shared memory file 110. The hash table 106 consists of a plurality of entries storing data block addresses 201 through 208. The number of entries, which serves as a dimension of the shared memory space, is supposed to be a theoretical limit value, such as the quotient of the division of the maximum capacity of the extended memory by the data block length.

Into the data block addresses 201 through 208 are successively stored the addresses of the data blocks of the shared memory file perceived at the time of actuation. In the example of FIG. 2, where the number of data blocks is 4 and that of hash table entries is 8, the table entries and the data blocks are associated as indicated by arrows in the diagram (both the data block address 1 (201) and the data block address 5 (205) store the pointer to the data block 1 (211), the data block address 2 (202) and the data block address 6 (206) store that to the data block 2, and so forth).

As the (additional) shared memory file 110 is added, the hash table updating means 108 alters the data block addresses 5 and 6 (205, 206) so that they point to the data blocks 5 and 6 (215, 216) on the added shared memory file. This operation makes possible expansion of the number of available data blocks, i.e. the data space of the shared memory file, without changing the hash width (the number of hash entries). Further, application programs and data blocks are associated with each other by hashing of any shared data identifier between application programs sharing the data and mapping it to the hash width.

Next will be described in detail the operation of the first preferred embodiment of the present invention with reference to drawings.

First will be described initialization by the shared memory file access means 107 at the time of actuating the first host.

First, the inter-host locking means 103 acquires an inter-host lock for the hash table 106 (step 301). Then, the total number of data blocks are acquired for all the shared memory files 104 on the extended memory 100 (step 302), and a hash table 106 having a number of entries equivalent to the number of data blocks is prepared. All the data block addresses on the prepared hash table 106 are set so as to equally point to the data blocks on the shared memory files 104 present on the extended memory 100 (step 303). Next, information on the prepared hash table 106, more specifically the number of hash entries and that of data blocks, are stored into the control file 109 on the extended memory 100

(step 304). Finally, the inter-host lock for the hash table 106 is released (step 305) to complete initialization.

A host actuated second or later, instead of going through the processing of step 302 on the flow chart of initialization, reads the number of data blocks of all the shared memory files 104 and that of hash table entries out of the control file 109, and performs processing to prepare a hash table 106 on the basis of these numbers. After that, processing at step 304 is skipped, and processing at step 305 is performed.

Next will be described processing to add a shared memory file 110.

Figure 3:
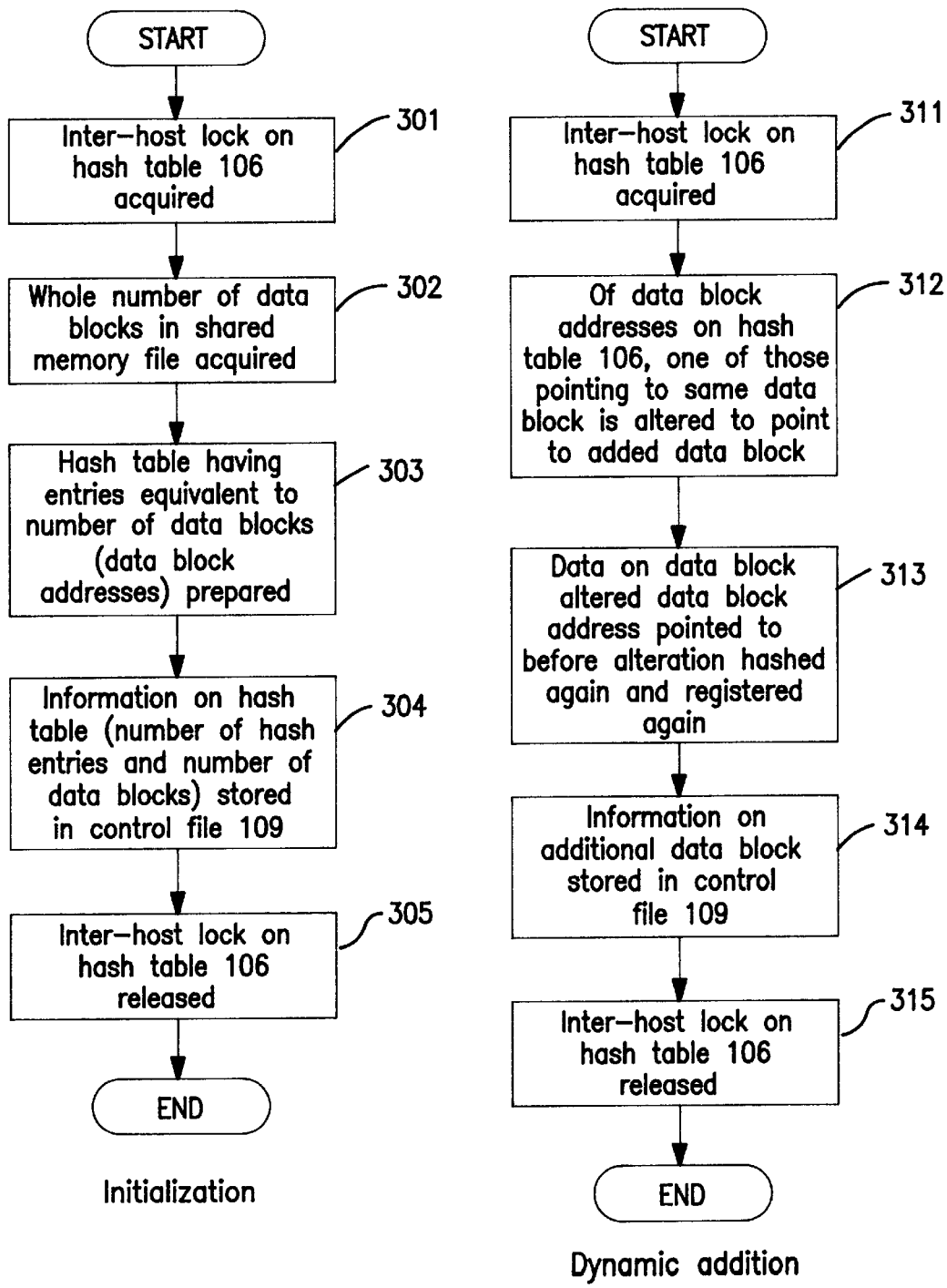
FIG. 3 is a flow chart showing the operation of the preferred embodiment of the invention.

First, the shared memory adding means 111, in response to a request for addition of the shared memory file 110 from the OS, application program or the like, allocates another (additional) shared memory file 110 on the extended memory 100. Next, the shared file adding means 111 requests the hash table updating means 108 to register the newly prepared (additional) shared memory file 110 into the hash table 106. The flow chart of FIG. 3 shows the processings thereafter.

The hash table updating means 108 requests the shared memory file access means 107 for an inter-host lock for the hash table 106 (step 311). If it acquires the lock, it checks the number of data blocks in the (additional) shared memory file 110, and alters one of the data block addresses, out of those on the hash table 106, pointing to the same data block so as to point to the data block to be newly added (step 312). Next, it again hashes the identifier of data on the data block to which the altered data block address pointed before the alteration, and stores the data into the data block indicated by the data block address stored in the entry, corresponding to the value obtained as a result of the hashing, in the hash table 106 (step 313). As a result, information on the additional data blocks is stored into the control file 109 (step 314). Finally, the inter-host locking for the hash table 106 is released (upon this releasing, the other host is notified of the lock release) (step 315).

The other host (the host not executing the shared file adding means 111) receiving the notification of lock release at step 315 maintains compatibility between the hosts vis-a-vis the shared memory files by updating the hash table 106 in accordance with information from the control file 109. Incidentally, no data transfer whatsoever takes place in this processing.

A Second Preferred Embodiment

Next will be described in detail a variation of the preferred embodiment of the present invention with reference to drawings.

Figure 4:
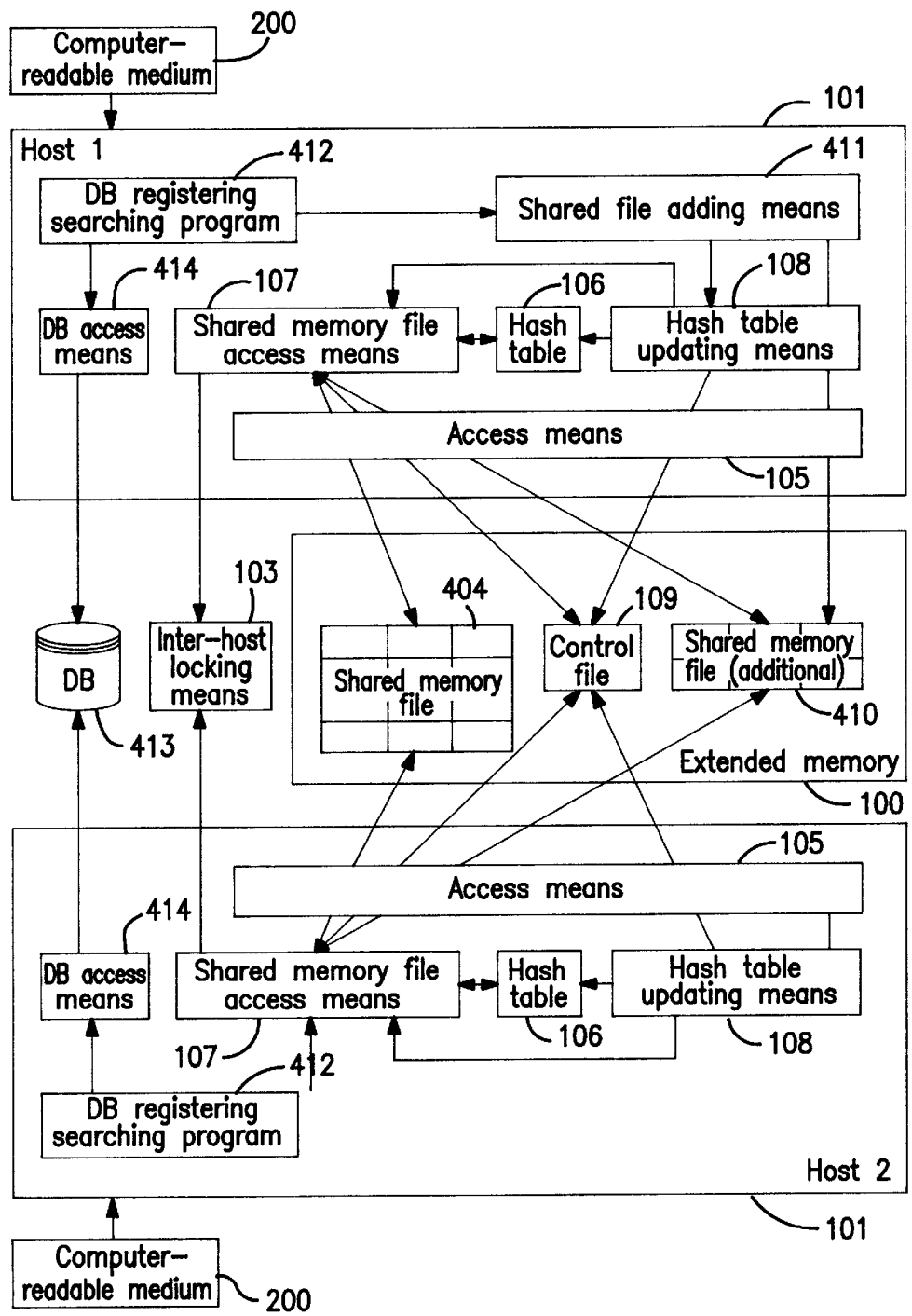
FIG. 4 is a block diagram illustrating another preferred embodiment of the invention.

Referring to FIG. 4, this variation consists of an external memory unit for holding a DB 413 in addition to an extended memory 100, hosts 1 (101) and 2 (102) and inter-host locking means 103 similar to the corresponding ones in the embodiment illustrated in FIG. 1; on the extended memory 100, there are a shared buffer 404, which is a counterpart to the shared memory file 104, an additional shared buffer 410 and a control file 109; on each of the hosts 1 and 2, there are access means 105, a hash table 106, hash table updating means 108, shared memory file access means 107, shared buffer adding means 411, which is a counterpart to the shared file adding means 111, a DB registering/ searching program 412, which is a counterpart to the application program 112, and DB access means 414.

Next will be described in detail the operation of this variation with reference to FIG. 4.

The DB registering/searching program 412 shares the use of the DB 413 between the hosts. The DB 413 is built up on a large-capacity external memory, such as a magnetic disk.

Where there is only one host computer, the frequency of actually accessing the DB 413 could be reduced by using the memory as buffer in DB accessing and DB accessing can be thereby sped up, but where the DB 413 is to be shared among a plurality of host computers, even if the inherent memory of each host is used as buffer, the buffers should be purged in commit processing to achieve data compatibility among the hosts, resulting in deteriorated DB access performance. In view of this problem, by setting the shared buffer 404 on the extended memory 100, which permits fast access, next only in speed to intrinsic memories, and can be shared among the plurality of hosts, and using it as buffer for DB accessing, the buffer purging at the time of commit processing can be dispensed with, and the performance of DB accessing can be sped up.

However, in this case, as the shared buffer 404 is shared by the hosts, extension of this shared buffer 404 would require synchronism among the hosts and maintaining association between the identifier for managing each buffer area and the buffer area. For ensuring this association between the identifier and the buffer area, it is a usual practice to use hashing so that search can be performed at high speed.

Incidentally, if the hash width (the number of hash entries) is increased to dynamically extend the shared buffer 404, the association between the already secure buffer and the identifier will change, and maintaining this association requires a transfer of data in the buffer. As this data transfer should cover the data areas belonging to all the data blocks, it would mean consumption of an enormous amount of CPU resources.

In view of this problem, according to the present invention, in order to dispense with the need to alter the hash width when dynamically extending the shared buffer 404, a hash table 106 having a number of entries equivalent to that of data blocks is prepared in advance and, when the dynamic extension is to be accomplished, the data areas whose transfer is needed is limited to data areas in specific data blocks by altering one of the data block addresses, out of those stored in entries in the hash table 106, pointing to the same data block in the shared buffer 404 so as to point to the newly added data block. The cost of transfer can be thereby saved substantially.

The processing to add the shared buffer 410 to the shared buffer 404 will be described below.

When expansion of the capacity of the shared buffer is required for the purpose of improving the DB access performance or the like, any one of the host computers designates the capacity to which the shared buffer is to be extended, and the shared buffer adding means 411 is actuated.

The shared buffer adding means 411, given the designation of the capacity to which the shared buffer is to be extended, allocates the (additional) shared buffer 410 on the extended memory 100 by using the access means 105, and then calls the hash table updating means 108.

The hash table updating means 108, called by the shared buffer adding means 411, acquires a lock for the hash table 106 from the inter-host locking means 103 via the shared memory file access means 107. This lock has an effect to lock the hash tables 106 on all the hosts. Next, the hash table updating means 108 assigns one of the data block addresses, out of the plurality of entries in the hash table 106, pointing to the same data block to all the data blocks on the (additional) shared buffer 410. This will make every subsequent securing of a new data area to be accomplished vis-a-vis the (additional) shared buffer 410 (no processing to secure a new data area is operable until the inter-host lock on the hash table 106 is released). Then, the identifier of the data on the data block to which the altered data block address pointed before the alteration is hashed again, and the data are stored in the data block pointed to by the data block address stored in the entry, associated with the value thereby obtained, in the hash table 106.

Obviously, if the data block obtained by hashing again is the same as the current data block, no data transfer will occur. In other words, a transfer occurs only when the result of re-hashing points to a data block on the (additional) shared buffer 410. Completion of this transfer processing makes the previously stored data accessible (until the inter-host lock on the hash table 106 is released, no access to stored data is operable).

Next, the hash table updating means 108, using the access means 105, writes information on the updated hash table 106 into the control file 109, and requests the shared memory file access means 107 to release the inter-host lock on the hash table 106.

The shared memory file access means 107 requests the inter-host locking means 103 to unlock the hash table 106.

The inter-host locking means 103, upon receiving the request from the shared memory file access means 107 to unlock the hash table 106, releases the lock, and notifies all other hosts of the release of this lock. Upon receiving this notification, each host checks the contents of the control file 109 and, if it judges that the shared buffer has been dynamically extended, updates the hash table 106 on its own memory to the extended state. These actions make the shared buffer 404 and the (additional) shared buffer 410 available for use by all the hosts.

This completes the operation of the first preferred embodiment of the invention.

Next will be described in detail a second preferred embodiment of the present invention with reference to drawings.

Referring to FIG. 1, the second preferred embodiment of the invention is provided with, in addition to the configuration of the first embodiment, a computer-readable medium 200, such as a magnetic disk or a semiconductor memory, for recording a program to cause the hosts 1 (101) and 2 (102) and the inter-host locking means 103 to execute processings pertaining to the first embodiment.

The program is read from the computer-readable medium 200 into the hosts 1 (101) and 2 (102) and the inter-host locking means 103 to control the operations of the hosts 1 (101) and 2 (102) and the inter-host locking means 103. Each of the hosts 1 (101) and 2 (102), under the control of the program, executes the same processings as the access means 105, shared memory file access means 107, hash table updating means 108 and shared file adding means 111 in the first preferred embodiment.

This completes the operation of the second preferred embodiment of the invention.

As hitherto described, the present invention has the benefit of enabling a plurality of hosts to efficiently share the use of a plurality of shared memory files because hash tables for specifying the data blocks of the shared memory files are prepared, at the time of actuating the hosts, in a large size in anticipation of the addition of shared memory files and, when any shared memory file is added, the added data blocks and the hash tables can be associated with each other without having to alter the hash width (the number of hash entries).

The invention provides the further benefit of making possible efficient utilization of storage areas including shared memory files without allowing fragmentation to arise, because the initial shared memory files and the additional shared memory files for shared use among the plurality of hosts are managed as divided into a plurality of data blocks of the same size.

Although the invention has been described in detail above with reference to various preferred embodiments thereof, it will be appreciated by persons skilled in the art that these embodiments have been provided solely for illustrative purposes, but are in no way to be regarded as limiting the invention. Instead, various modifications and substitutions of equivalent techniques will be readily apparent to those skilled in the art upon reading this specification, and such modifications and substitutions are to be regarded as falling within the true scope and spirit of the following claims.

What is claimed is:

1. A dynamic adding system for memory files shared among hosts comprising:

an external memory unit providing a shared memory file comprising a plurality of data blocks of equal size;

hash tables each comprising a plurality of entries, each entry being associated with one of said plurality of data blocks;

a plurality of host computers for hashing an identifier of the data, determining the associated entry in the hash table based on the result of the hashing and storing the data into the data block associated with the entry, when data are stored into each of said data blocks; and an inter-host locking means for exclusively controlling access to said hash tables possessed by said host computers, wherein said external memory unit further includes a control file for storing information based on association between data blocks in said shared memory file and entries in said hash table, each of said host computers has a shared memory file access means which, if a first host computer is actuated before other host computers, then said first host computer:

i) exclusively controls with said inter-host locking means access by said other host computers to said hash tables of said other host computers, ii) acquires the whole number of data blocks in said shared memory file, iii) prepares said hash table comprising entries no less than the number of the data blocks, iv) stores into said control file information based on association between the entries in the hash table and the data blocks in said shared memory file, and v) releases with said inter-host locking means the exclusive control on access by said other host computers to said hash tables possessed by said other host computers, and if said first host computer is actuated after any of said other host computers, then said first computer;

i) exclusively controls with said inter-host locking means access by said other host computers to said hash tables of the respective other host computers, ii) reads said associating information out of said control file, iii) prepares said hash table within said first host computer on the basis of said associating information, and iv) releases with said inter-host locking means the exclusive control on access by said other host computers to said hash tables possessed by said other host computers.

2. A dynamic adding system for memory files shared among hosts, as claimed in claim 1 wherein:
  each of said host computers is further provided with a shared memory adding means for adding said shared memory file on said external memory unit; and
  a hash table updating means for exclusively controlling with said inter-host locking means, after said shared memory file is added to said external memory by said shared file adding means:
    i) access by said other host computers to said hash tables of said other host computers,
    ii) associating one entry in said hash table associated with a specific data block in the existing shared memory file, with one data block in the added shared memory file.
    iii) transferring, when the associated entry in said hash table is associated with the result of hashing of the identifier of data in the specific data block, the data of the specific data block to the associated data block in the added shared memory file,
    iv) updating said associating information stored in said control file, and
    v) releasing with said inter-host locking means the exclusive control on access by said other host computers to said hash tables possessed by said other host computers.

3. A dynamnic adding system for memory files shared among hosts, as claimed in claim 2, wherein
  responsive to said associating information stored in said control file being updated by another host computer, said hash table updating means further updates said hash table associated with each of said host computers on the basis of the updated associating information.

4. A dynamic adding method for memory files shared among hosts comprising:
  a step of providing data stored in each of a plurality of data blocks of the same size to constitute a shared memory file to be used by the plurality of host computers;
  a data storing step during which each of a plurality of host computers hashes an identifier of the data to determine the associated entry in a hash table comprising a plurality of entries each associated with one or another of said data blocks, and stores the data into the data block associated with the entry;
  a hash table preparing step at which each of said host computers, when a first host computer is actuated before other host computers, said first host computer:
    i) exclusively controls access by said other host computers to said hash tables of said other host computers,
    ii) acquires the whole number of data blocks in said shared memory file,
    iii) prepares said hash table comprising entries no lees than the number of the data blocks,
    iv) stores into the control file, shared by said host computers, information associating the entries in the hash table with the data blocks in said shared memory file, and
    v) releases the exclusive control on access by said other host computers to said hash tables possessed by the said other host computers; and
  when said first host computer is actuated after any of said other host computers, said first host computer:
    i) exclusively controls access by said other host computers to said hash tables of said other host computers,
    ii) reads said associating information out of said control file,
    iii) prepares said hash table within said first host computer on the basis of said associating information, and
    iv) releases the exclusive control on access by said other host computers to said hash tables possessed by said other host computers.

5. A dynamic adding method for memory files shared among hosts, as claimed in claim 4, further including:
  a shared file adding step at which each of said host computers adds said shared memory file; and
  a hash table updating step at which each of said host computers:
    i) exclusively controls access by other host computers to said hash tables of the respective said other host computers,
    ii) associates one ot the plurality of entries in said hash table associated with a specific data block in existing said shared memory file with one of the plurality of data blocks in said shared memory file added at said shared file adding step,
    iii) transfers, if the entry in said hash table, which has been associated, is associated with the result of hashing of the identifier of data in the specified data block, the data of the specific block to the data block in added said shared memory file, which has been associated;
    iv) updates said associating information stored in said control file; and
    v) releases the exclusive control on access by said other host computers to said hash tables possessed by the said other host computers.

6. A dynamic adding method for memory files shared among hosts, as claimed in claim 5, wherein;
  upon said associating information stored in said control file being updated by another of said host computers other than a first host computer, said hash table updating step further comprises said hash table of said first host computer being further updated on the basis of the updated associating information.

7. A computer-readable medium storing a program to cause:
  each of a plurality of host computers to perform:
    when data are stored into each of a plurality of data blocks of equal size constituting a shared memory file to be shared by said host computers, storage processing to hash an identifier of the data to determine the associated entry in hash tables each comprising a plurality of entries each associated with one of said data blocks, and store the data into the data block associated with the entry;
    hash table preparation processing to exclusively control by a first host computer, when said first host computer is actuated before any other host computer:
      i) access by said other host computers to said hash tables possessed by the said other host computers,
      ii) acquire the whole number of data blocks in said shared memory file,
      iii) prepare said hash table comprising entries no less than the number of the data blocks,
      iv) store into a control file shared by said host computers information on association between the entries in the hash table and the data blocks in said shared memory file; and
      v) release the exclusive control on access by any of said other host computers to said hash tables possessed by the said other host computers; and when said first host computer is actuated after said other host computers, to exclusively control by said first host computer:
  i) access by said other host computers to said hash tables of the respective said other host computers,
  ii) read said associating information out of said control file,
  iii) prepare said hash table within said first host computer on the basis of said associating information, and
  iv) release the exclusive control on access by said other host computers to said hash tables possessed by the said other host computers.

8. A computer-readable medium, as claimed in claim 7, storing a program further to cause:
  each of said host computers to perform shared memory adding processing to add said shared memory file; and
  hash table update processing by:
    i) exclusively control access by said other host computers to said hash tables of the respective said other host computers,
    ii) associating one of the plurality of entries in said hash table, associated with a specific data block in the existing said shared memory file, with one of the added plurality of data blocks in said shared memory file,
    iii) transferring the data of the specific data block to the associated data block in the added said shared memory file when the associated entry in said hash table is associated with the result of hashing of the identifier of data in the specific data block,
    iv) updating said associating information stored in said control file, and
    v) releasing the exclusive control on access by said other host computers to said hash tables possessed by said other host computers.

9. A computer-readable medium, as claimed in claim 8, storing a program further to perform:
  when said associating information stored in said control file is updated by another of said other host computers other than a first host computer, processing to update said hash table of said first host computer on the basis of the associating information.

* * * * *